United States Patent
Karaoguz et al.

(10) Patent No.: US 8,270,810 B2
(45) Date of Patent: Sep. 18, 2012

(54) METHOD AND SYSTEM FOR ADVERTISEMENT INSERTION AND PLAYBACK FOR STB WITH PVR FUNCTIONALITY

(75) Inventors: Jeyhan Karaoguz, Irvine, CA (US); Sherman (Xuemin) Chen, Rancho Santa Fe, CA (US)

(73) Assignee: Broadcom Corporation, Irvine, CA (US)

(*) Notice: Subject to any disclaimer, the term of this patent is extended or adjusted under 35 U.S.C. 154(b) by 398 days.

(21) Appl. No.: 12/617,849

(22) Filed: Nov. 13, 2009

(65) Prior Publication Data

US 2010/0054707 A1   Mar. 4, 2010

Related U.S. Application Data

(63) Continuation-in-part of application No. 10/675,468, filed on Sep. 30, 2003.

(60) Provisional application No. 60/432,472, filed on Dec. 11, 2002, provisional application No. 60/443,894, filed on Jan. 30, 2003, provisional application No. 60/457,179, filed on Mar. 25, 2003, provisional application No. 60/447,110, filed on Feb. 12, 2003.

(51) Int. Cl.
*H04N 9/80* (2006.01)
*H04N 5/783* (2006.01)

(52) U.S. Cl. ........ 386/248; 386/239; 386/249; 386/250; 386/343

(58) Field of Classification Search .......... None
See application file for complete search history.

(56) References Cited

U.S. PATENT DOCUMENTS

| | | | |
|---|---|---|---|
| 6,774,926 B1 | 8/2004 | Ellis et al. | |
| 6,944,877 B1* | 9/2005 | Lord et al. | 725/32 |
| 7,620,965 B2* | 11/2009 | Miyazaki et al. | 725/42 |
| 2002/0016971 A1 | 2/2002 | Berezowski et al. | |
| 2002/0083441 A1* | 6/2002 | Flickinger et al. | 725/32 |
| 2002/0124251 A1* | 9/2002 | Hunter et al. | 725/32 |
| 2002/0144262 A1* | 10/2002 | Plotnick et al. | 725/32 |
| 2003/0039465 A1* | 2/2003 | Bjorgan et al. | 386/20 |
| 2003/0101454 A1* | 5/2003 | Ozer et al. | 725/42 |
| 2003/0149975 A1* | 8/2003 | Eldering et al. | 725/34 |
| 2004/0003051 A1 | 1/2004 | Krzyzanowski et al. | |
| 2004/0003398 A1* | 1/2004 | Donian et al. | 725/34 |
| 2004/0268384 A1* | 12/2004 | Stone | 725/32 |
| 2005/0028208 A1 | 2/2005 | Ellis et al. | |
| 2006/0013557 A1* | 1/2006 | Poslinski | 386/46 |

* cited by examiner

*Primary Examiner* — Thai Tran
*Assistant Examiner* — Hung Dang
(74) *Attorney, Agent, or Firm* — Garlick & Markison; Jessica W. Smith (57) ABSTRACT

A personal video recorder (PVR) enabled set-top box (STB) may be operable to store an advertisement and associated playback control information received from a media provider into a storage device in the PVR enabled STB, schedule the stored advertisement for viewing based on the associated playback control information. The PVR enabled STB may be operable to insert the stored advertisement into media content for one or more times based on the scheduling. The PVR enabled STB may be operable to cause display of the stored advertisement and the media content in different transport formats. At a forward/reverse playback position during a PVR playback, the PVR enabled STB may be operable to cause display of the stored advertisement when a play count associated with the stored advertisement is less than a count threshold at the forward/reverse playback position.

20 Claims, 5 Drawing Sheets

METHOD AND SYSTEM FOR ADVERTISEMENT INSERTION AND PLAYBACK FOR STB WITH PVR FUNCTIONALITY

CROSS-REFERENCE TO RELATED APPLICATIONS/INCORPORATION BY REFERENCE

This patent application is a continuation-in-part of U.S. patent application Ser. No. 10/675468, which was filed on Sep. 30, 2003.

U.S. patent application Ser. No. 10/675,468 makes reference to, claims priority to, and claims benefit from:
U.S. Provisional Application Ser. No. 60457179, which was filed on Mar. 25, 2003;
U.S. Provisional Application Ser. No. 60447110, which was filed on Feb. 12, 2003;
U.S. Provisional Application Ser. No. 60443894, which was filed on Jan. 30, 2003; and
U.S. Provisional Application Ser. No. 60432472, which was filed on Dec. 11, 2002.

The above stated applications are hereby incorporated herein by reference in its entirety.

FIELD OF THE INVENTION

Certain embodiments of the invention relate to advertising over a communication network. More specifically, certain embodiments of the invention relate to a method and system for advertisement insertion and playback for STB with PVR functionality.

BACKGROUND OF THE INVENTION

Currently, television (TV) commercials or advertisements are provided by third ($3^{rd}$) party broadcasters independent of the person that may be viewing the commercial or advertisement. Inserting commercials or advertisements into the TV programs or media content and showing these advertisements to audiences or consumers are key applications for the broadcast service providers or media providers.

In order to reach a wide range of consumers, advertisers make various attempts at predicting, based on the type of media content, those who may be consuming the media content and, therefore, who would be more likely to view their advertisements. Based on these predictions, advertisers may target those consumers that are more likely to consume a particular type of media content that may be associated with certain types of commercials or advertisements. However, many consumers of various types of media content often ignore many commercials or advertisements because the consumers are not interested in those commercials or advertisements. Also, commercials or advertisements that are of interest to a consumer may not be viewed by a consumer since a consumer may be unavailable when the commercials or advertisements are being presented. For example, a consumer may not be watching television at the instants when a particular commercial is being broadcasted.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for advertisement insertion and playback for STB with PVR functionality, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for advertisement insertion and playback for STB with PVR functionality. In various embodiments of the invention, a personal video recorder (PVR) enabled set-top box (STB) may be operable to store an advertisement and associated playback control information received from a media provider into a storage device in the PVR enabled STB, schedule the stored advertisement for viewing based on the associated playback control information, and cause display of the stored advertisement at a scheduled time based on the scheduling and a PVR operation of the PVR enabled STB. The PVR enabled STB may be operable to insert the stored advertisement into media content for one or more times based on the scheduling. In this regard, the PVR enabled STB may be operable to cause display of the stored advertisement and the media content in different transport formats. The PVR enabled STB may be operable to replace an original advertisement carried in the media content with the stored advertisement. The PVR enabled STB may be operable to convert a transport format associated with the stored advertisement to a different transport format associated with the media content for display.

The PVR enabled STB may be operable to receive the media content remotely from the media provider or receive the media content locally from the storage device during a PVR playback of the PVR operation. In this regard, the PVR enabled STB may be operable to set a play count associated with the stored advertisement to a value of zero at a beginning of the PVR playback, increase the play count according to the display of the stored advertisement during the PVR playback and compare the play count to a count threshold at a forward/reverse playback position during the PVR playback. In instances when the play count associated with the stored advertisement is less than the count threshold at the forward/reverse playback position, the PVR enabled STB may be operable to cause display of the stored advertisement, increase the play count associated with the stored advertisement by a value of one at an end of the display of the stored advertisement and cause display of the media content at the end of the display of the stored advertisement. In instances when the play count associated with the stored advertisement is equal to or greater than the count threshold at the forward/reverse playback position, the PVR enabled STB may be operable to cause display of the media content directly.

Figure 1:
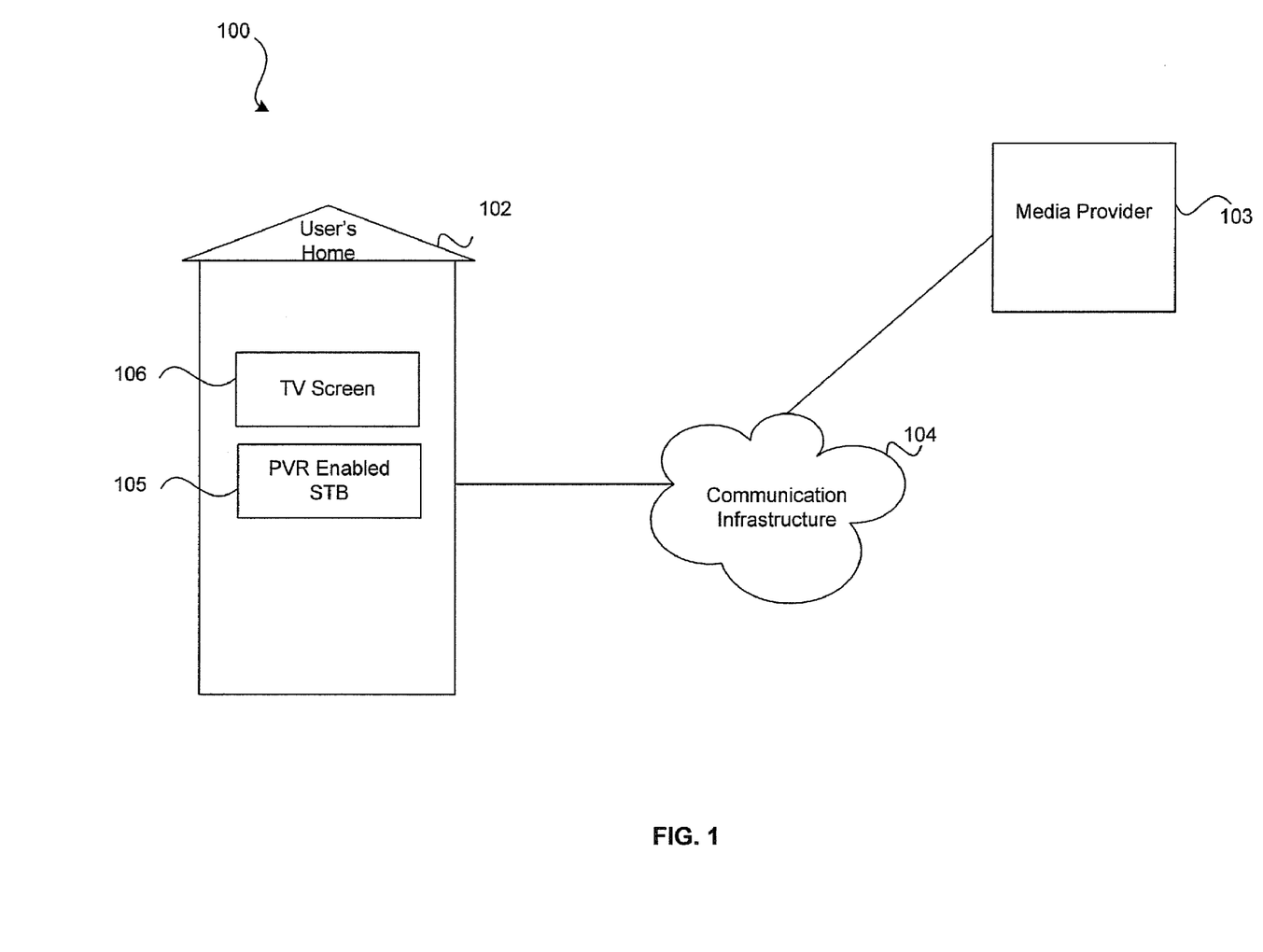
FIG. 1 is a block diagram illustrating an exemplary media exchange network that is operable to provide advertisement insertion and playback for STB with PVR functionality, in accordance with an embodiment of the invention.

FIG. 1 is a block diagram illustrating an exemplary media exchange network that is operable to provide advertisement insertion and playback for STB with PVR functionality, in accordance with an embodiment of the invention. Referring to FIG. 1, there is shown a media exchange network 100. The media exchange network 100 may comprise a media provider 103, a communication infrastructure 104 and a user location which may be a user's home 102. The user's home 102 may comprise a PVR enabled STB 105 and a display device such as a TV screen 106.

The media provider 103 may comprise suitable logic, circuitry, interfaces and/or code that may be operable to provide media content or TV programs to user locations such as the user's home 102 via the communication infrastructure 104. The media provider 103 may be operable to supply commercials or advertisements in video, audio and/or textual formats to the PVR enabled STB 105 for local advertisement insertion and playback. The media provider 103 may be a television broadcaster, a portal, a radio broadcaster, an advertisement company and/or an Internet service provider (ISP), any of which may provide media content in a digital format.

The communication infrastructure 104 may comprise suitable logic, devices, interfaces and/or code that may be operable to provide access and/or transport functionality that may facilitate the exchange of media between, for example, the user's home 102 and the media provider 103. The communication infrastructure 104 may comprise cable infrastructure, DSL infrastructure, satellite network infrastructure, Internet infrastructure, intranet infrastructure or other similar access and/or transport infrastructure.

The PVR enabled STB 105 may comprise suitable logic, circuitry, interfaces and/or code that may be operable to receive, process and/or decode the media content and/or advertisements from the media provider 103 via the communication infrastructure 104. The PVR enabled STB 105 such as, for example, a cable TV receiver or a satellite TV receiver may be operable to provide personal video recorder (PVR) or digital video recorder (DVR) functionality and record video or media in a digital format into a storage device such as, for example, a hard disk a flash drive or other non-volatile storage device in the PVR enabled STB.

The PVR enabled STB 105 may be operable to store an advertisement and associated playback control information such as, for example, an insertion descriptor received from a media provider 103 into the storage device in the PVR enabled STB 105, schedule the stored advertisement for viewing based on the associated playback control information, and cause display of the stored advertisement at a scheduled time based on the scheduling and a PVR operation of the PVR enabled STB 105. The PVR enabled STB 105 may be operable to insert the stored advertisement into media content for one or more times based on the scheduling. In an exemplary embodiment of the invention, the PVR enabled STB 105 may be operable to cause display of the stored advertisement and the media content in different transport formats. Different transport formats may comprise MPEG-2, ASF, Flash, MP4, DIRECTV DSS, etc. In this regard, for example, the stored advertisement may be in a DIRECTV DSS format while the media content may be in a MPEG-2 transport format. In an exemplary embodiment of the invention, the PVR enabled STB 105 may be operable to replace an original advertisement carried in the media content with the stored advertisement. In an exemplary embodiment of the invention, the PVR enabled STB 105 may be operable to convert a transport format associated with the stored advertisement such as a DIRECTV DSS format to a different transport format associated with the media content such as a MPEG-2 transport format for display.

The PVR enabled STB 105 may be operable to receive the media content remotely from the media provider 103 or receive the media content locally from the storage device during a PVR playback of the PVR operation. In this regard, the PVR enabled STB 105 may be operable to set a play count associated with the stored advertisement to a value of zero at a beginning of the PVR playback, increase the play count according to the display of the stored advertisement during the PVR playback and compare the play count to a count threshold at a forward/reverse playback position during the PVR playback. The forward/reverse playback positions may comprise, for example, FF, REW or the like. In instances when the play count associated with the stored advertisement is less than the count threshold at the forward/reverse playback position, the PVR enabled STB 105 may be operable to cause display of the stored advertisement, increase the play count associated with the stored advertisement by a value of one at an end of the display of the stored advertisement and cause display of the media content at the end of the display of the stored advertisement. In instances when the play count associated with the stored advertisement is equal to or greater than the count threshold at the forward/reverse playback position, the PVR enabled STB 105 may be operable to cause display of the media content directly. In this regard, the PVR enabled STB 105 may be able to enforce the display of correlated advertisements and/or allow no skipping of advertising during the PVR playback.

The TV screen 106 may comprise suitable logic, circuitry, interfaces and/or code that may be operable to display or present processed or decoded media content or TV programs as well as inserted advertisements to users.

In operation, the PVR enabled STB 105 may be operable to receive media content and/or advertisements from the media provider 103 via the communication infrastructure 104. The PVR enabled STB 105 may be operable to store an advertisement and associated playback control information received from the media provider 103 into the storage device in the PVR enabled STB 105, schedule the stored advertisement for viewing based on the associated playback control information, and cause display of the stored advertisement at a scheduled time based on the scheduling and a PVR operation of the PVR enabled STB 105. The PVR enabled STB 105 may be operable to insert the stored advertisement into media content for one or more times based on the scheduling. The PVR enabled STB 105 may be operable to cause display of the stored advertisement and the media content in different transport formats. The PVR enabled STB 105 may be operable to replace an original advertisement carried in the media content with the stored advertisement. The PVR enabled STB 105 may be operable to convert a transport format associated with the stored advertisement to a different transport format associated with the media content for display.

The PVR enabled STB 105 may be operable to receive the media content remotely from the media provider 103 or receive the media content locally from the storage device during a PVR playback of the PVR operation. In this regard, the PVR enabled STB 105 may be operable to set a play count associated with the stored advertisement to a value of zero at a beginning of the PVR playback, increase the play count according to the display of the stored advertisement during the PVR playback and compare the play count to a count threshold at a forward/reverse playback position such as, for example, FF, REW during the PVR playback. In instances when the play count associated with the stored advertisement is less than the count threshold at the forward/reverse playback position, the PVR enabled STB 105 may be operable to cause display of the stored advertisement, increase the play count associated with the stored advertisement by a value of one at an end of the display of the stored advertisement and cause display of the media content at the end of the display of the stored advertisement. In instances when the play count associated with the stored advertisement is equal to or greater than the count threshold at the forward/reverse playback position, the PVR enabled STB 105 may be operable to cause display of the media content directly. The TV screen 106 may be operable to display or present the processed media content and/or advertisements to users.

Figure 2:
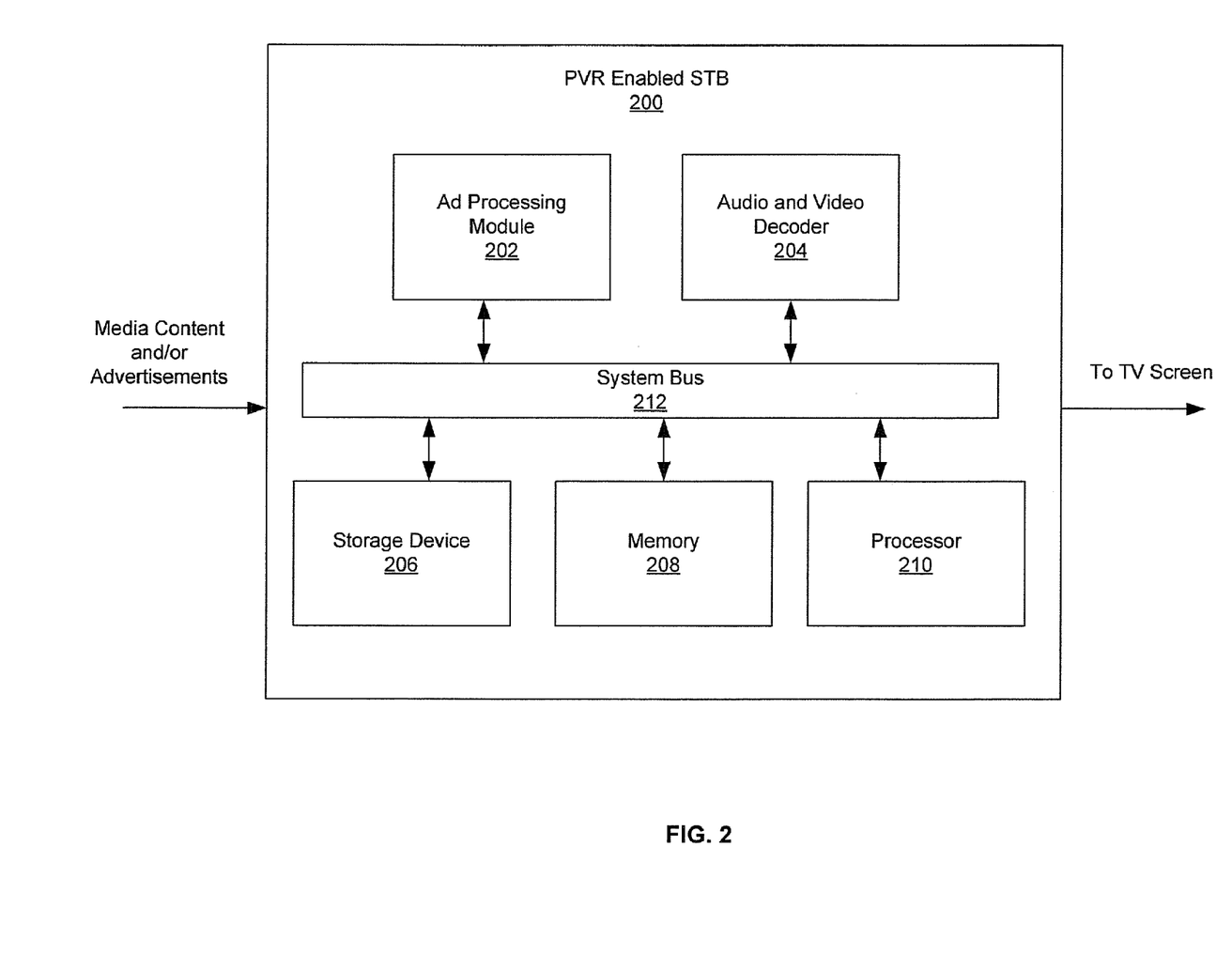
FIG. 2 is a block diagram illustrating an exemplary PVR enabled STB that is operable to provide advertisement insertion and playback for STB with PVR functionality, in accordance with an embodiment of the invention.

FIG. 2 is a block diagram illustrating an exemplary PVR enabled STB that is operable to provide advertisement insertion and playback for STB with PVR functionality, in accordance with an embodiment of the invention. Referring to FIG. 2, there is shown a PVR enabled STB 200. The PVR enabled STB 200 may comprise an Ad processing module 202, an audio and video decoder 204, a storage device 206, a memory 208 a processor 210 and a system bus 212.

The Ad processing module 202 may comprise suitable logic, circuitry, interfaces and/or code that may be operable to receive advertisements from the media provider 103 and process the advertisements for viewing. The Ad processing module 202 may be operable to store an advertisement and associated playback control information such as, for example, an insertion descriptor received from a media provider 103 into the storage device 206, schedule the stored advertisement for viewing based on the associated playback control information, and insert and playback the stored advertisement at a scheduled time based on the scheduling and a PVR operation of the PVR enabled STB 200. The Ad processing module 202 may be operable to insert the stored advertisement into media content for one or more times based on the scheduling. In an exemplary embodiment of the invention, the Ad processing module 202 may be operable to insert or splice the stored advertisement into the media content in different transport formats. Different transport formats may comprise MPEG-2, ASF, Flash, MP4, DIRECTV DSS, etc. In this regard, for example, the stored advertisement may be in a DIRECTV DSS format while the media content may be in a MPEG-2 transport format. In an exemplary embodiment of the invention, the Ad processing module 202 may be operable to replace an original advertisement carried in the media content with the stored advertisement. In an exemplary embodiment of the invention, the Ad processing module 202 may be operable to convert a transport format associated with the stored advertisement such as a DIRECTV DSS format to a different transport format associated with the media content such as a MPEG-2 transport format for processing.

The Ad processing module 202 may be operable to insert the stored advertisement into media content that may be broadcast content received remotely from the media provider 103 or pre-recorded content received locally from the storage device 206 during a PVR playback of the PVR operation of the PVR enabled STB 200. In this regard, the Ad processing module 202 may be operable to set a play count associated with the stored advertisement to a value of zero at a beginning of the PVR playback, increase the play count according to the playback of the stored advertisement during the PVR playback and compare the play count to a count threshold at a forward/reverse playback position during the PVR playback. The forward/reverse playback positions may comprise, for example, FF, REW or the like. In instances when the play count associated with the stored advertisement is less than the count threshold at the forward/reverse playback position, the Ad processing module 202 may be operable to playback the stored advertisement, increase the play count associated with the stored advertisement by a value of one at an end of the playback of the stored advertisement and enable a playback of the media content at the end of the playback of the stored advertisement. In instances when the play count associated with the stored advertisement is equal to or greater than the count threshold at the forward/reverse playback position, the Ad processing module 202 may be operable to enable a playback of the media content directly without a playback of the stored advertisement.

The audio and video decoder 204 may comprise suitable logic, circuitry, interfaces and/or code that may be operable to process or decode the audio and video streams of media content and/or the inserted advertisements. The processed or decoded audio and video streams may be presented at the TV screen 106. The audio and video decoder 204 may be configured to specify and display the inserted advertisement and the media content in different transport formats.

The storage device 206 may comprise suitable logic, circuitry, interfaces and/or code that may be operable to store media content or TV programs for playing and/or advertisements for insertion and playback utilizing the PVR functionality of the PVR enabled STB 200. The storage device 206 may comprise, for example, a hard disk, a flash drive or other non-volatile storage device.

The memory 208 may comprise suitable logic, circuitry, interfaces and/or code that may be operable to store information such as executable instructions and data that may be utilized by the processor 210, the audio and video decoder 204 and the ad processing module 202 to perform various functions of the PVR enabled STB 200.

The processor 210 may comprise suitable logic, circuitry, interfaces and/or code that may be operable to communicate with the audio and video decoder 204 and the ad processing module 202 to perform the processing or decoding functions, the advertisement insertion and playback functions and the PVR functions of the PVR enabled STB 200.

The system bus 212 may comprise suitable logic, circuitry, interfaces and/or code that may be operable to provide communication connections for transferring data among modules such as, for example, the Ad processing module 202, the audio and video decoder 204, the storage device 206, the memory 208 and the processor 210 in the PVR enabled STB 200.

In operation, The Ad processing module 202 may be operable to store an advertisement and associated playback control information received from a media provider 103 into the storage device 206, schedule the stored advertisement for viewing based on the associated playback control information, and insert and playback the stored advertisement at a scheduled time based on the scheduling and a PVR operation of the PVR enabled STB 200. The Ad processing module 202 may be operable to insert the stored advertisement into media content for one or more times based on the scheduling. The Ad processing module 202 may be operable to insert or splice the stored advertisement into the media content in different transport formats. The Ad processing module 202 may be operable to replace an original advertisement carried in the media content with the stored advertisement. The Ad processing module 202 may be operable to convert a transport format associated with the stored advertisement to a different transport format associated with the media content for processing.

The Ad processing module 202 may be operable to insert the stored advertisement into media content that may be broadcast content received remotely from the media provider 103 or pre-recorded content received locally from the storage device 206 during a PVR playback of the PVR operation of the PVR enabled STB 200. In this regard, the Ad processing module 202 may be operable to set a play count associated with the stored advertisement to a value of zero at a beginning of the PVR playback, increase the play count according to the playback of the stored advertisement during the PVR playback and compare the play count to a count threshold at a forward/reverse playback position during the PVR playback. In instances when the play count associated with the stored advertisement is less than the count threshold at the forward/reverse playback position, the Ad processing module 202 may be operable to playback the stored advertisement, increase the play count associated with the stored advertisement by a value of one at an end of the playback of the stored advertisement and enable a playback of the media content at the end of the playback of the stored advertisement. In instances when the play count associated with the stored advertisement is equal to or greater than the count threshold at the forward/reverse playback position, the Ad processing module 202 may be operable to enable a playback of the media content directly without a playback of the stored advertisement. The audio and video decoder 204 may be operable to process or decode and present the media content and/or the inserted advertisement at the TV screen 106. The audio and video decoder 204 may be configured to specify and display the inserted advertisement and the media content in different transport formats.

Figure 3:
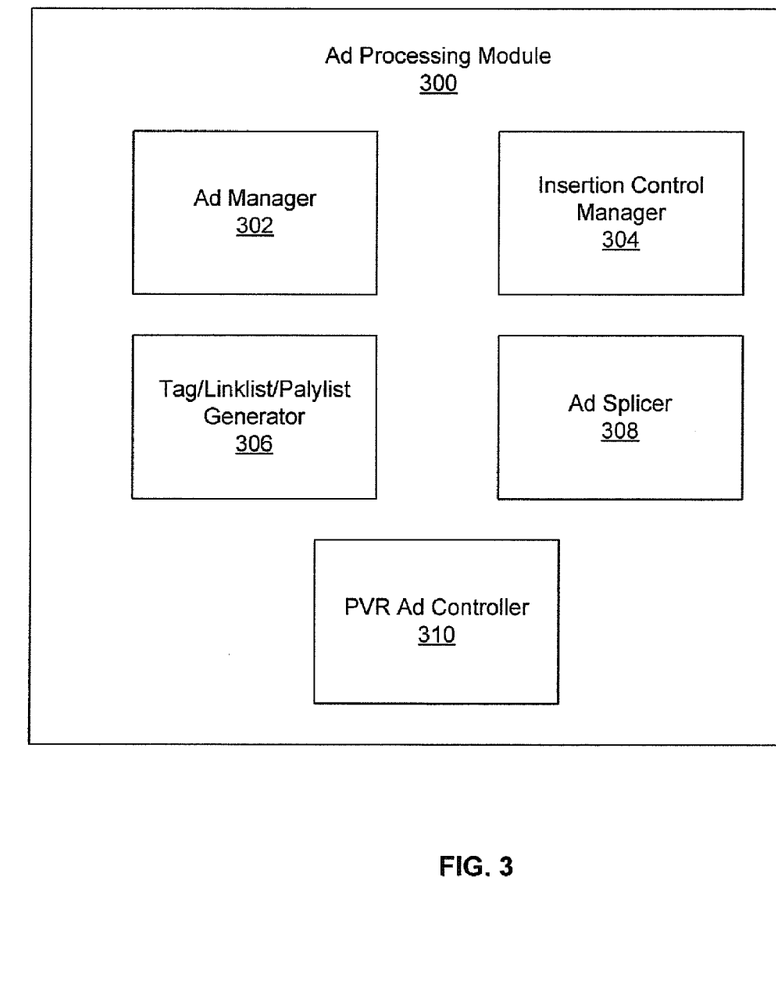
FIG. 3 is a block diagram illustrating an exemplary Ad processing module that is operable to provide advertisement insertion and playback for STB with PVR functionality, in accordance with an embodiment of the invention.

FIG. 3 is a block diagram illustrating an exemplary Ad processing module that is operable to provide advertisement insertion and playback for STB with PVR functionality, in accordance with an embodiment of the invention. Referring to FIG. 3, there is shown an Ad processing module 300. The Ad processing module 300 may comprise an Ad manager 302, an insertion control manager 304, a tag/linklist/playlist generator 306, an Ad splicer 308 and a PVR Ad controller 310.

The Ad manager 302 may comprise suitable logic, circuitry, interfaces and/or code that may be operable to manager advertisements pushed and received from the media provider 103. The Ad manager 302 may be operable to store the advertisements and associated playback control information, such as, for example, insertion descriptors into the storage device 206 ahead of insertion/playback times.

The insertion control manager 304 may comprise suitable logic, circuitry, interfaces and/or code that may be operable to monitor and extract playback insertion information such as, for example, insertion descriptors. The insertion control manager 304 may be operable to monitor media content streams for insertion triggers such as, for example, digital cue-packets. When the insertion triggers are received, the stored advertisement may be inserted or spliced into the media content for display.

The tag/linklist/playlist generator 306 may comprise suitable logic, circuitry, interfaces and/or code that may be operable to generate a tag/linklist/playlist for a stored advertisement utilizing the associated playback control information such as, for example, the insertion descriptor. The tag/linklist/playlist generator 306 may be operable to determine and schedule the stored advertisement to be played based on the associated tag/linklist/playlist. The tag/linklist/playlist generator 306 may be operable to determine and schedule the stored advertisement to be inserted into media content for one or more (multiple) times.

The Ad splicer 308 may comprise suitable logic, circuitry, interfaces and/or code that may be operable to insert or splice a stored advertisement into media content for display as triggered by an insertion trigger and specified by an associated tag/linklist/playlist. The Ad splicer 308 may be operable to insert or splice the stored advertisement into the media content in different transport formats. Different transport formats may comprise MPEG-2, ASF, Flash, MP4, DIRECTV DSS, etc. In this regard, for example, the stored advertisement may be in a DIRECTV DSS format while the media content may be in a MPEG-2 transport format. The Ad splicer 308 may be operable to replace an original advertisement carried in media content with the stored advertisement from the storage device 206. The Ad splicer 308 may be operable to convert a transport format associated with the stored advertisement such as a DIRECTV DSS format to a different transport format associated with the media content such as a MPEG-2 transport format for splicing.

The PVR Ad controller 310 may comprise suitable logic, circuitry, interfaces and/or code that may be operable to control the insertion and playback of a stored advertisement at a forward/reverse playback position during a PVR playback of a PVR operation. The forward/reverse playback position may comprise, for example, FF, REW or the like. The PVR Ad controller 310 may be operable to generate an index table for efficient look ups and/or access of correlated advertisement information associated with media content during the PVR playback. At a beginning of the PVR playback, the PVR Ad controller 310 may be operable to set a play count, for example, in a secure RAM of the memory 208 associated with the stored advertisement to a value of zero, and increase the play count according to the insertion and playback of the stored advertisement during the PVR playback.

At a forward/reverse position such as, for example, a FF or a REW during the PVR playback, the PVR Ad controller 310 may be operable to determine a picture position of the media content, identify the correlated advertisement information utilizing the index table and determine the associated play count value. In instances when the play count associated with the stored advertisement is less than a specified count threshold at the forward/reverse playback position, the PVR Ad controller 310 may be operable to playback the stored advertisement, increase the play count associated with the stored advertisement by a value of one at an end of the playback of the stored advertisement and enable a playback of the media content from the picture position at the end of the playback of the stored advertisement. In instances when the play count associated with the stored advertisement is equal to or greater than the specified count threshold at the forward/reverse playback position, the PVR Ad controller 310 may be operable to enable a playback of the media content directly from the picture position without a playback of the stored advertisement.

In operation, the Ad manager 302 may be operable to store the advertisements and associated playback control information, such as, for example, insertion descriptors into the storage device 206 ahead of insertion/playback times. The insertion control manager 304 may be operable to monitor and extract playback insertion information such as, for example, insertion descriptors. The insertion control manager 304 may be operable to monitor media content streams for insertion triggers. The tag/linklist/playlist generator 306 may be operable to generate a tag/linklist/playlist for a stored advertisement utilizing the associated playback control information such as, for example, the insertion descriptor. The tag/linklist/ playlist generator 306 may be operable to determine and schedule the stored advertisement to be played based on the associated tag/linklist/playlist. The tag/linklist/playlist generator 306 may be operable to determine and schedule the stored advertisement to be inserted into media content for one or more (multiple) times. The Ad splicer 308 may be operable to insert or splice a stored advertisement into media content for display as triggered by an insertion trigger and specified by an associated tag/linklist/playlist. The Ad splicer 308 may be operable to insert or splice the stored advertisement into the media content in different transport formats. In this regard, for example, the stored advertisement may be in a DIRECTV DSS format while the media content may be in a MPEG-2 transport format. The Ad splicer 308 may be operable to replace an original advertisement carried in media content with the stored advertisement from the storage device 206. The Ad splicer 308 may be operable to convert a transport format associated with the stored advertisement such as a DIRECTV DSS format to a different transport format associated with the media content such as a MPEG-2 transport format for splicing.

The PVR Ad controller 310 may be operable to control the insertion and playback of a stored advertisement at a forward/ reverse playback position during a PVR playback of a PVR operation. The PVR Ad controller 310 may be operable to generate an index table for efficient look ups and/or access of correlated advertisement information associated with media content during the PVR playback. At a beginning of the PVR playback, the PVR Ad controller 310 may be operable to set a play count associated with the stored advertisement to a value of zero, and increase the play count according to the insertion and playback of the stored advertisement during the PVR playback.

At a forward/reverse position such as, for example, a FF or a REW during the PVR playback, the PVR Ad controller 310 may be operable to determine a picture position of the media content, identify the correlated advertisement information utilizing the index table and determine the associated play count value. In instances when the play count associated with the stored advertisement is less than a specified count threshold at the forward/reverse playback position, the PVR Ad controller 310 may be operable to playback the stored advertisement, increase the play count associated with the stored advertisement by a value of one at an end of the playback of the stored advertisement and enable a playback of the media content from the picture position at the end of the playback of the stored advertisement. In instances when the play count associated with the stored advertisement is equal to or greater than the specified count threshold at the forward/reverse playback position, the PVR Ad controller 310 may be operable to enable a playback of the media content directly from the picture position without a playback of the stored advertisement.

Figure 4:
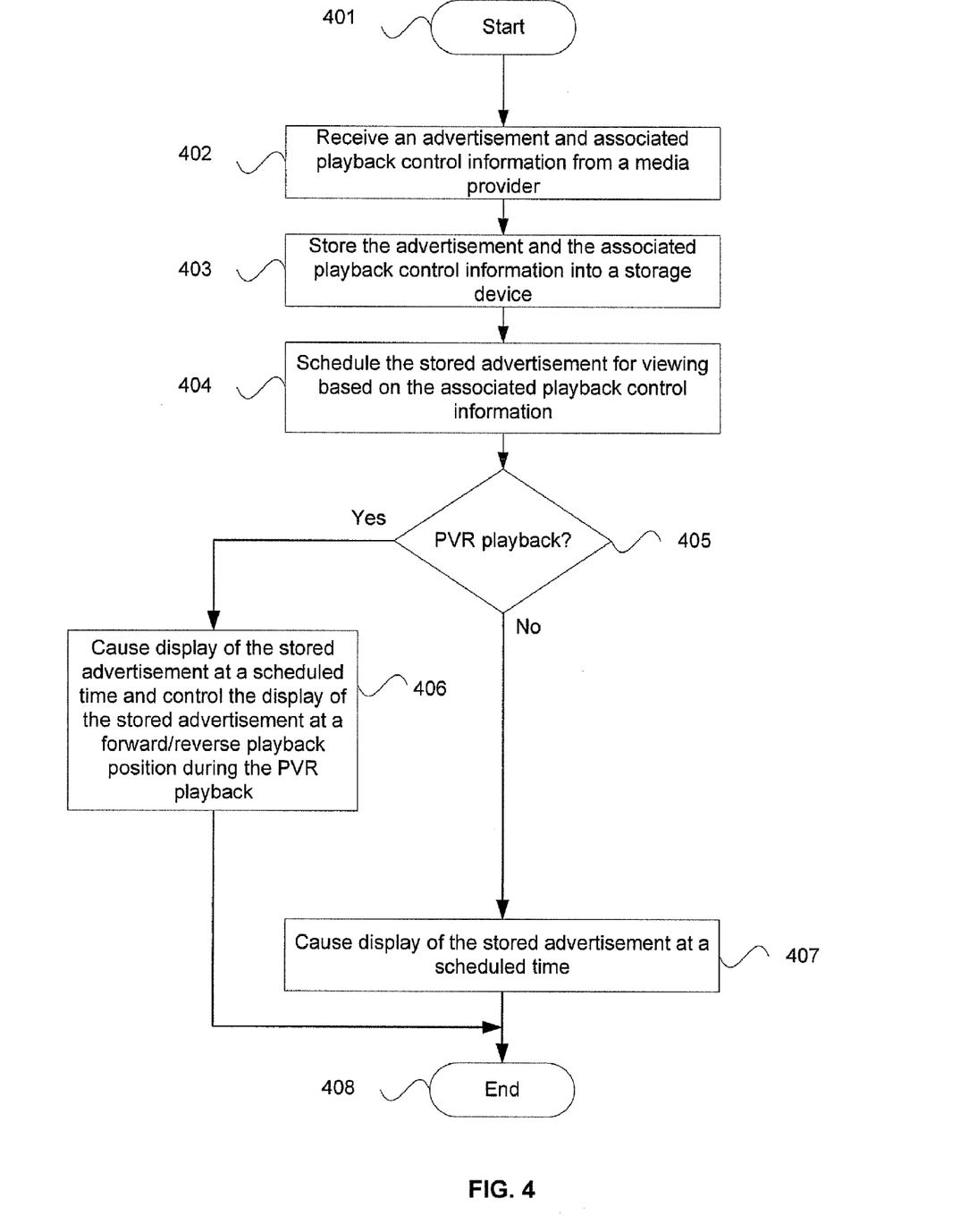
FIG. 4 is a flow chart illustrating exemplary steps for advertisement insertion and playback for STB with PVR functionality, in accordance with an embodiment of the invention.

FIG. 4 is a flow chart illustrating exemplary steps for advertisement insertion and playback for STB with PVR functionality, in accordance with an embodiment of the invention. Referring to FIG. 4, the exemplary steps start at step 401. In step 402, the PVR enabled STB 200 may be operable to receive an advertisement and associated playback control information from a media provider 103. In step 403, the PVR enabled STB 200 may be operable to store the advertisement and the associated playback control information into a storage device 206. In step 404, the PVR enabled STB 200 may be operable to schedule the stored advertisement for viewing based on the associated playback control information. In step 405, a PVR playback is checked. In instances when there is no PVR playback and media content is broadcast content received from the media provider 103, the exemplary steps may proceed to step 407. In step 407, the PVR enabled STB 200 may be operable to cause display of the stored advertisement at a scheduled time. The exemplary steps may proceed to the end step 408. In step 405, in instances when there is a PVR playback and media content is pre-recorded content received from the storage device 206 during the PVR playback, the exemplary steps may proceed to step 406. In step 406, the PVR enabled STB 200 may be operable to cause display of the stored advertisement at a scheduled time and control the display of the stored advertisement at a forward/ reverse playback position during the PVR playback. The exemplary steps may proceed to the end step 408.

Figure 5:
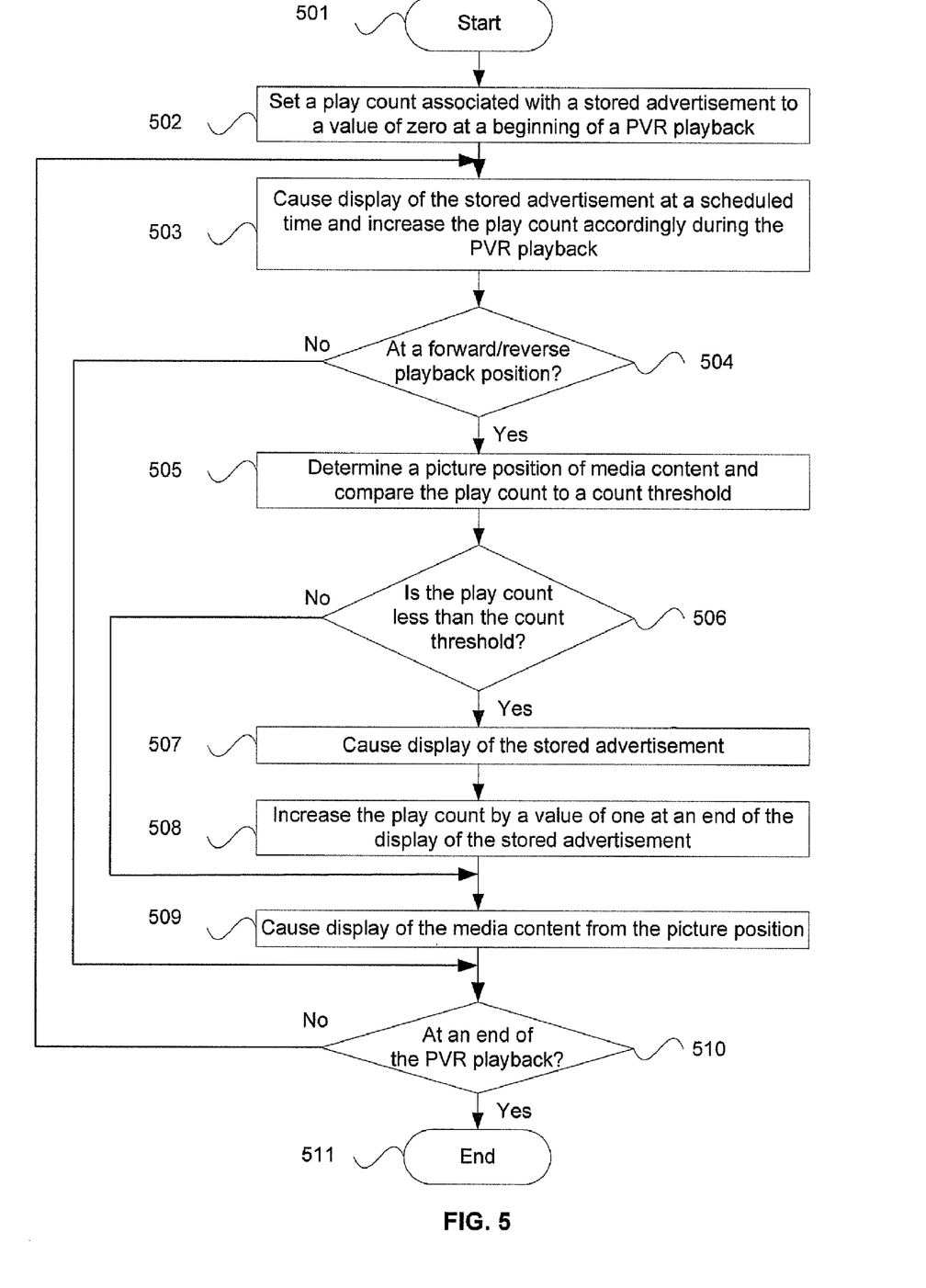
FIG. 5 is a flow chart illustrating exemplary steps for controlling advertisement insertion and playback during PVR playback, in accordance with an embodiment of the invention.

FIG. 5 is a flow chart illustrating exemplary steps for controlling advertisement insertion and playback during PVR playback, in accordance with an embodiment of the invention. Referring to FIG. 5, the exemplary steps start at step 501. In step 502, The PVR enabled STB 200 may be operable to set a play count associated with a stored advertisement to a value of zero at a beginning of a PVR playback. In step 503, the PVR enabled STB 200 may be operable to cause display of the stored advertisement at a scheduled time and increase the play count accordingly during the PVR playback. In step 504, a forward/reverse playback position is checked. In instances when the PVR is at a forward/reverse playback position, the exemplary steps may proceed to step 505. In step 505, the PVR enabled STB 200 may be operable to determine a picture position of media content and compare the play count to a count threshold. In step 506, the result of the comparison between the play count and the count threshold is checked. In instances when the play count is less than the count threshold, the exemplary steps may proceed to step 507. In step 507, the PVR enabled STB 200 may be operable to cause display of the stored advertisement. In step 508, the PVR enabled STB 200 may be operable to increase the play count by a value of one at an end of the display of the stored advertisement. In step 509, the PVR enabled STB 200 may be operable to cause display of the media content from the picture position. In step 510, an end of the PVR playback is checked. In instances when the PVR is at an end of the PVR playback, the exemplary steps may proceed to the end step 511. In step 504, in instances when the PVR is not at a forward/reverse playback position, the exemplary steps may proceed to step 510. In step 506, in instances when the play count is equal to or greater than the count threshold, the exemplary steps may proceed to step 509. In step 510, instances when the PVR is not at an end of the PVR playback, the exemplary steps may proceed to step 503.

In various embodiments of the invention, a PVR enabled STB 105, 200 may be operable to store an advertisement and associated playback control information received from a media provider 103 into a storage device 206 in the PVR enabled STB 105, 200, schedule the stored advertisement for viewing based on the associated playback control information, and cause display of the stored advertisement at a scheduled time based on the scheduling and a PVR operation of the PVR enabled STB 105, 200. The PVR enabled STB 200 may be operable to insert the stored advertisement into media content for one or more times based on the scheduling. In this regard, the PVR enabled STB 200 may be operable to cause display of the stored advertisement and the media content in different transport formats. The PVR enabled STB 200 may be operable to replace an original advertisement carried in the media content with the stored advertisement. The PVR enabled STB 200 may be operable to convert a transport format associated with the stored advertisement to a different transport format associated with the media content for display.

The PVR enabled STB 105, 200 may be operable to receive the media content remotely from the media provider 103 or receive the media content locally from the storage device 206 during a PVR playback of the PVR operation. In this regard, the PVR enabled STB 200 may be operable to set a play count associated with the stored advertisement to a value of zero at a beginning of the PVR playback, increase the play count according to the display of the stored advertisement during the PVR playback and compare the play count to a count threshold at a forward/reverse playback position during the PVR playback. In instances when the play count associated with the stored advertisement is less than the count threshold at the forward/reverse playback position, the PVR enabled STB 200 may be operable to cause display of the stored advertisement, increase the play count associated with the stored advertisement by a value of one at an end of the display of the stored advertisement and cause display of the media content at the end of the display of the stored advertisement. In instances when the play count associated with the stored advertisement is equal to or greater than the count threshold at the forward/reverse playback position, the PVR enabled STB 200 may be operable to cause display of the media content directly.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for advertisement insertion and playback for STB with PVR functionality.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing an advertisement in a communication channel, the method comprising:
    performing by one or more processors and/or circuits in a personal video recorder (PVR) enabled set-top box (STB):
        storing an advertisement and associated playback control information received from a media provider into a storage device in said PVR enabled STB, wherein the associated playback control information includes a count threshold;
        scheduling said stored advertisement for viewing based on said associated playback control information;
        setting a play count associated with said stored advertisement at a beginning of said PVR playback;
        inserting said stored advertisement into said media content based on said scheduling;
        causing display of said stored advertisement at a scheduled time during said PVR playback based on said scheduling and a PVR operation of said PVR enabled STB;
        incrementing said play count in response to said display of said stored advertisement during said PVR playback; and
        comparing said play count to the count threshold at a forward/reverse playback position during said PVR playback.

2. The method according to claim 1, comprising inserting said stored advertisement into media content for one or more times based on said scheduling.

3. The method according to claim 2, comprising causing display of said stored advertisement and said media content in different transport formats.

4. The method according to claim 2, comprising replacing an original advertisement carried in said media content with said stored advertisement.

5. The method according to claim 2, comprising converting a transport format associated with said stored advertisement to a different transport format associated with said media content for display.

6. The method according to claim 2, comprising receiving said media content remotely from said media provider.

7. The method according to claim 2, comprising receiving said media content locally from said storage device during a PVR playback of said PVR operation.

8. The method according to claim 7, wherein setting a play count associated with said stored advertisement at a beginning of said PVR playback comprising:
    setting said play count associated with said stored advertisement to an initial value of zero at the beginning of said PVR playback.

9. The method according to claim 1, comprising:
    causing display of said stored advertisement when said play count associated with said stored advertisement is less than said count threshold at said forward/reverse playback position;
    increasing said play count associated with said stored advertisement by a value of one at an end of said display of said stored advertisement; and
    causing display of said media content at said end of said display of said stored advertisement.

10. The method according to claim 1, comprising causing display of said media content directly when said play count associated with said stored advertisement is equal to or greater than said count threshold at said forward/reverse playback position.

11. A system for providing an advertisement in a communication channel, the system comprising:
  one or more processors and/or circuits for use in a personal video recorder (PVR) enabled set-top box (STB), wherein said one or more processors and/or circuits are operable to:
    store an advertisement and associated playback control information received from a media provider into a storage device in said PVR enabled STB, wherein the associated playback control information includes a count threshold;
    schedule said stored advertisement for viewing based on said associated playback control information;
    set a play count associated with said stored advertisement at a beginning of said PVR playback;
    insert said stored advertisement into media content based on said scheduling;
    cause display of said stored advertisement at a scheduled time during said PVR playback based on said scheduling;
    increment said play count in response to said display of said stored advertisement during said PVR playback; and
    compare said play count to the count threshold at a forward/reverse playback position during said PVR playback.

12. The system according to claim 11, wherein said one or more processors and/or circuits are operable to insert said stored advertisement into media content for one or more times based on said scheduling.

13. The system according to claim 12, wherein said one or more processors and/or circuits are operable to cause display of said stored advertisement and said media content in different transport formats.

14. The system according to claim 12, wherein said one or more processors and/or circuits are operable to replace an original advertisement carried in said media content with said stored advertisement.

15. The system according to claim 12, wherein said one or more processors and/or circuits are operable to convert a transport format associated with said stored advertisement to a different transport format associated with said media content for display.

16. The system according to claim 12, wherein said one or more processors and/or circuits are operable to receive said media content remotely from said media provider.

17. The system according to claim 12, wherein said one or more processors and/or circuits are operable to receive said media content locally from said storage device during a PVR playback of said PVR operation.

18. The system according to claim 17, wherein said one or more processors and/or circuits are operable to set a play count associated with said stored advertisement at a beginning of said PVR playback by:
  setting the play count associated with said stored advertisement to an initial value of zero at the beginning of said PVR playback.

19. The system according to claim 1, wherein said one or more processors and/or circuits are operable to:
  cause display of said stored advertisement when said play count associated with said stored advertisement is less than said count threshold at said forward/reverse playback position;
  increase said play count associated with said stored advertisement by a value of one at an end of said display of said stored advertisement; and
  cause display of said media content at said end of said display of said stored advertisement.

20. The system according to claim 1, wherein said one or more processors and/or circuits are operable to cause display of said media content directly when said play count associated with said stored advertisement is equal to or greater than said count threshold at said forward/reverse playback position.

\* \* \* \* \*